United States Patent
Carmona et al.

(10) Patent No.: US 10,254,194 B2
(45) Date of Patent: Apr. 9, 2019

(54) INSTRUMENTED CONCRETE STRUCTURAL ELEMENT

(71) Applicants: Commissariat a l'energie atomique et aux energies alternatives, Paris (FR); CONSOLIS, Courbevoie (FR)

(72) Inventors: Mikael Carmona, Tencin (FR); Laurent Jouanet, Autrans (FR); Tony Camuel, Maisons Laffitte (FR)

(73) Assignees: Commissariat A L'Energie et aux Energies Alternatives, Paris (FR); CONSOLIS, Courbevoie (FR)

( * ) Notice: Subject to any disclaimer, the term of this patent is extended or adjusted under 35 U.S.C. 154(b) by 0 days.

(21) Appl. No.: 15/715,786

(22) Filed: Sep. 26, 2017

(65) Prior Publication Data
US 2018/0087999 A1    Mar. 29, 2018

(30) Foreign Application Priority Data
Sep. 26, 2016    (FR) ...................... 16 59035

(51) Int. Cl.
*G01M 5/00* (2006.01)
*E04C 3/26* (2006.01)
(Continued)

(52) U.S. Cl.
CPC .............. *G01M 5/0041* (2013.01); *E04C 3/26* (2013.01); *G01B 21/32* (2013.01); *G01H 1/00* (2013.01);
(Continued)

(58) Field of Classification Search
CPC ..... G01M 5/0041; G01M 5/0025; E04C 3/26; G01H 1/00; E04B 1/22; E04B 2103/02
(Continued)

(56) References Cited

U.S. PATENT DOCUMENTS 5,675,085 A * 10/1997 Hayashi ............... G01N 29/075
                                                                73/597
6,772,091 B1 * 8/2004 Roberts ................ G01N 23/223
                                                                324/644
(Continued)

FOREIGN PATENT DOCUMENTS

CN        105910779 A    8/2016

OTHER PUBLICATIONS

French Preliminary Search Report dated May 22, 2017 in French Application 16 59035 filed on Sep. 26, 2016 (with English Translation of Categories of Cited Documents and Written Opinion).
(Continued)

*Primary Examiner* — Max H Noori
(74) *Attorney, Agent, or Firm* — Oblon, McClelland, Maier & Neustadt, L.L.P.

(57) ABSTRACT

A concrete structural element is provided that includes a concrete matrix; a steel reinforcing structure embedded in said matrix; at least first and second attitude sensors at a distance from one another in a direction, embedded in said matrix and fixed to said reinforcing structure; and a processing circuit configured to recover attitude measurements supplied by each attitude sensor and configured to compute a deformation of said structural element relative to said direction as a function of the attitude measurements recovered.

16 Claims, 3 Drawing Sheets

(51) Int. Cl.
*G01H 1/00* (2006.01)
*G01B 21/32* (2006.01)
*E04B 1/22* (2006.01)

(52) U.S. Cl.
CPC ........ *G01M 5/0025* (2013.01); *G01M 5/0058* (2013.01); *G01M 5/0091* (2013.01); *E04B 1/22* (2013.01); *E04B 2103/02* (2013.01)

(58) Field of Classification Search
USPC .......................................................... 73/803
See application file for complete search history.

(56) References Cited

U.S. PATENT DOCUMENTS

| | | | |
|---|---|---|---|
| 9,857,351 B2* | 1/2018 | Saleem | G01N 33/383 |
| 2012/0173150 A1* | 7/2012 | Romero | G01S 13/885 |
| | | | 702/14 |
| 2014/0012517 A1 | 1/2014 | Cheung et al. | |
| 2015/0309007 A1* | 10/2015 | Bellotti | G01N 29/348 |
| | | | 73/597 |
| 2018/0059060 A1* | 3/2018 | Dusseault | G01N 27/82 |

OTHER PUBLICATIONS

Arnaud Loaec et al. "Smart Sleeper—Measurement of bending moments in concrete sleepers laid on ballast tracks," Transport Research Arena, Paris, 2014, pp. 6.

* cited by examiner

INSTRUMENTED CONCRETE STRUCTURAL ELEMENT

The invention relates to the field of building and public works, and in particular to tracking the deformation of concrete structural elements during their life cycle.

The tracking of the state of health of concrete structures is growing strongly, for example to anticipate a failure of the structure, to track the trend of its deformation, or to implement preventive modifications. Concrete structural elements such as beams, support walls, or underground coffers are in particular increasingly often equipped to perform a tracking of their state of health.

The overall deformation of a structural element such as a beam is a static geometrical parameter linked to the application of a static load such as gravity, or a quasi-static load such as road traffic over a bridge for example, by contrast for example to a vibratory or propagated phenomenon. The tracking of the deformation of a structural element is performed over a period of several years, its trend being slow and of relatively low amplitude through the design of the structural element. Given the low amplitude of the variations of the deformation, the tracking of this deformation requires very great accuracy, typically 1 mm for 10 m.

A product, presented in 2014 under the marketing reference Smart Sleeper, is intended to determine the local deformations, that is to say deformations of the order of a few micrometers per meter. From these local deformations, the bending moments of a concrete railway line sleeper are deduced. This product was notably the subject of a presentation by Mrs. Loaëc et al., at the Transport Research Arena Convention held in Paris in 2014.

This product notably includes probes coated by the concrete in the production of the railway sleepers. This probe comprises an extensometer based on an optical fibre with Bragg gratings. The extensometer includes two metal plates 110 mm apart, positioned in a position at right angles relative to the axis of the sleeper to be manufactured. A pipe parallel to the axis of the sleeper links the two plates. An optical fibre runs through the pipe. This optical fibre comprises a Bragg grating, positioned inside the pipe. The fibre is fixed to each of the plates. Thus, the fibre between the two plates undergoes the same deformation as the surrounding concrete. An optical circuit is connected to one end of the fibre, to inject a light signal into it and measure the light signal reflected by the Bragg grating. The reflected light signal is a function of the Bragg grating formed in the fibre, and the tensile/compressive stress applied to this Bragg grating. A same optical fibre is typically used to form several probes by means of Bragg gratings implanted at different locations along this fibre.

Such probes must preferably be placed as far as possible from the neutral fibre of the sleeper, in order to measure a maximum deformation amplitude and thus exhibit a maximal measurement accuracy. The more distant the probe is from the neutral fibre, the closer it is to the surface of the concrete sleeper. The probe is then more exposed to risks of deterioration or to external disturbances. Moreover, the optical fibre with Bragg gratings is very sensitive to temperature and to its mode of incorporation in the structural element.

The proximity of a sensor to the surface of the concrete sleeper can also be of an intrusive nature because of its location in an area affected more strongly by stresses, including a reduction of efficiency of the concrete product and an embrittlement of the sleeper. Furthermore, this product makes it possible to measure only local deformations of the concrete product.

The invention aims to resolve one or more of these drawbacks. The invention thus relates to a concrete structural element, as defined in the attached claim 1.

The invention relates also to the variants of the dependent claims. A person skilled in the art will understand that each of the features of the variants of the dependent claims can be combined independently with the features of claim 1, without in any way constituting an intermediate generalization.

The invention relates also to a structure, comprising:
 several structural elements as mentioned above;
 a processing circuit configured to compute an overall deformation from the deformation computed for each of said structural elements.

Other features and advantages of the invention will emerge clearly from the description which is made thereof hereinbelow, in an indicative and nonlimiting manner, with reference to the attached drawings, in which.

Figure 1:
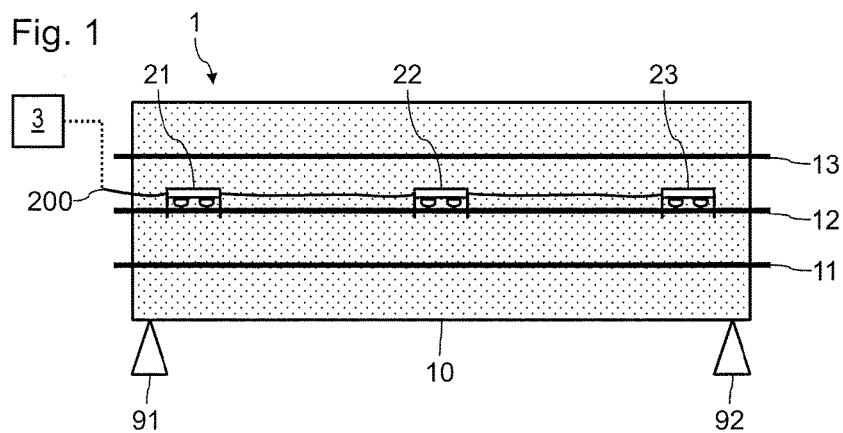
FIG. 1 is a side view in longitudinal cross section of an example of a concrete structural element according to an embodiment of the invention.
Figure 2:
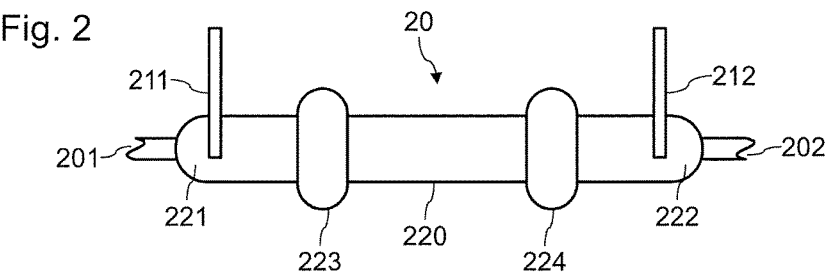
FIG. 2 is a side view of an example of an attitude sensor positioned in the structural element.
Figure 3:
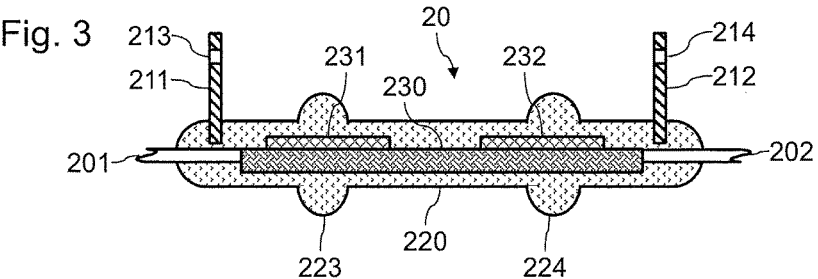
FIG. 3 is a side view in longitudinal cross section of the attitude sensor of FIG. 2.
Figure 4:
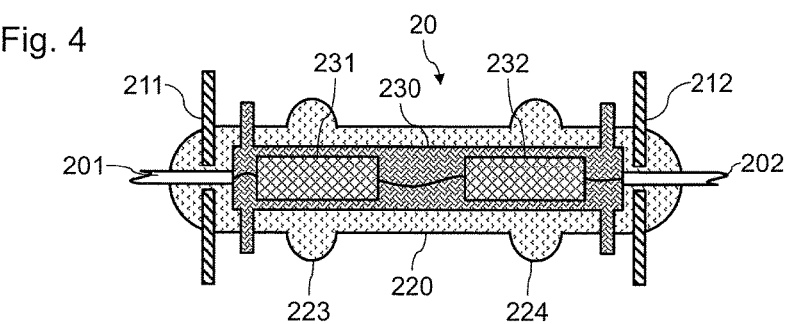
FIG. 4 is a plan view in longitudinal cross section of the attitude sensor of FIG. 2.
Figure 5:
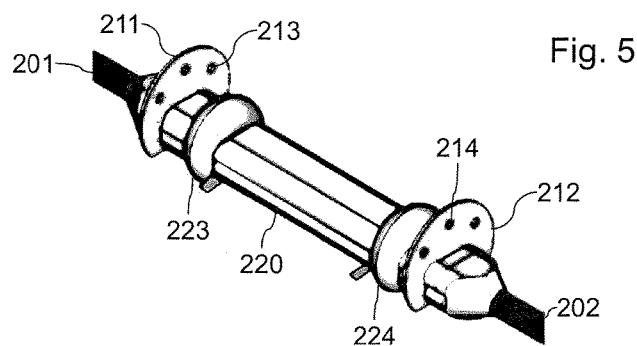
FIG. 5 is a perspective view of the attitude sensor of FIG. 2.

FIG. 1 is a side view in longitudinal cross section of an example of a concrete structural element 1 according to an embodiment of the invention. The structural element 1 comprises, on the one hand, a concrete matrix 10, and a steel reinforcing structure embedded in the concrete matrix 10. The steel reinforcing structure can advantageously be tensile stressed, in a manner known per se, with the prestressed or post-stressed concrete technology. Similarly, the steel reinforcing structure, embedded in the concrete matrix 10, can be dimensioned according to the rules for the construction of reinforced concrete with the use of longitudinal steel bars. The steel reinforcing structure here comprises several steel bars 11 to 13, embedded in the matrix 10. The steel bars 11 to 13 extend here in a longitudinal direction of the structural element 1. The steel bars 11 to 13 extend here over all the length of the structural element 1 in its longitudinal direction. The steel bars 11 to 13 can typically extend beyond the matrix 10 at the longitudinal ends of the structural element, to allow the application of a tensile stress (tensile stress in the steel strand during the pouring to induce a compressive prestressing (by pre-tension) in the concrete when the steel is relaxed) during the manufacturing method. The steel bars 11 to 13 can constitute a steel reinforcement or lattice. The steel bar or bars 11 to 13 advantageously have a diameter of between 5 and 50 mm. Such a steel reinforcement or lattice does not in itself constitute a beam, but a reinforcing structure that is known per se for the concrete matrix forming the majority of the beam or structural element 1. Such a reinforcement follows the deformations of the concrete in which it is embedded, the association of the steel bars of the reinforcement not in themselves forming a beam.

The structural element 1 rests here on two supports 91 and 92, positioned at its longitudinal ends. The structural element 1 is here subject to a deflection by its own weight, about an axis at right angles to this longitudinal direction. The structural element 1 thus exhibits a deformation relative to its longitudinal direction.

The structural element 1 further comprises several attitude sensors at a distance from one another in its longitudinal direction. The attitude of a sensor is defined by the rotation which allows the transition from the axis system of the sensor to a reference axis system. The attitude can be parameterized by three angles: the inclination, the roll and the azimuth. There are several ways of defining these three angles. When a sensor is incorporated in a concrete structural element such that one of its axes is tangential to the (virtual) fibre, or, in other words, to the longitudinal direction of the structural element, on which the array of sensors is positioned, then:

the inclination of the sensor then corresponds to the angle of the tangent of the fibre at the measurement point relative to an axis of a fixed reference frame (for example the axis directed by gravity);

the roll corresponds to the angle of the rotation about the axis directed by the tangent of the fibre at the measurement point;

the azimuth corresponds to the angle of the rotation about the axis directed by the axis of the fixed reference frame from which the inclination is defined.

The structural element 1 here comprises three attitude sensors 21, 22 and 23 distributed over its length. The attitude sensors 21 to 23 are embedded in the concrete matrix 10, which makes it possible to both protect them and to link their attitude to the deformation of the structural element 1, rather than extrapolate the deformation of the structural element from the outside. Moreover, because of their embedding in the concrete matrix 10, all of the developed surface of these sensors 21 to 23 is stressed by the deformations of this matrix 10. The reliability of the response of these sensors 21 to 23 is thus increased. The attitude sensors 21 to 23 are also fixed (for example by welding) in position from the reinforcing structure. Thus, their respective longitudinal positions relative to the structural element 1 can be defined with precision.

In this example, the attitude sensors are fixed or immobilized in position on the steel bar 12. The steel bar 12 is, in this case, positioned at the level of the neutral fibre of the structural element 1. In beam theory, the neutral fibre denotes a curve passing through the centre of gravity of the straight sections of the structural element 1. When applied to the field of small deformations, the length of this neutral fibre does not vary in deflection. A deformation calculated for the structural element 1 from attitude measurements at the level of the neutral fibre is therefore particularly accurate. The instrumentation with the attitude sensors 21 to 23 according to the invention is typically intended to detect a deformation of 1 mm over 10 meters of length of the structural element 1 on the axes x, y and z. By virtue of their fixing to the steel bar 12, the attitude sensors 21 to 23 are thus advantageously positioned at the level of the neutral fibre of the structural element 1. If the attitude sensors 21 to 23 are not positioned strictly at the level of the neutral fibre of the structural element 1, they are advantageously positioned at a distance at most equal to 150 mm from the neutral fibre of this structural element. The attitude sensors can also be advantageously positioned at a distance from the neutral fibre of the structural element 1 at most equal to 40% of the neutral fibre/surface distance of the structural element 1. In such a configuration, the attitude sensors 21 to 23 are also more protected from external attacks and disturbances by virtue of the concrete coating.

The attitude sensors 21 to 23 for example each comprise an accelerometer configured to measure at least one acceleration component in the longitudinal direction of the structural element 1, and a computation circuit configured to compute the attitude of the sensor as a function of the measurement from its accelerometer, in a manner that is known per se.

The accelerometers of these sensors 21 to 23 are for example formed by MEMS components. Such MEMS sensors have demonstrated their stability temperature-related stability and their stability over time, and can currently exhibit resolutions of the order of 0.1 mg. Such MEMS sensors are of inertial type and satisfy the inclination/attitude measurement when the load applied to the structural element 1 is static.

The attitude sensors 21 to 23 communicate with a processing circuit 3. The communication between the attitude sensors 21 to 23 and the processing circuit 3 is for example conducted via an electric cable or bundle 200. As detailed hereinbelow, the processing circuit 3 retrieves the attitude measurements supplied by each attitude sensor 21 to 23 and computes a deformation of the structural element 1 as a function of these attitude measurements.

The computed deformation can be useful for determining the state of health of a structure including the structural element. For example, if the deformation of the structural element 1 computed by the processing circuit 3 differs significantly from the deformation simulated in the design, a design, manufacturing or installation anomaly can be detected and corrected. The computed deformation notably makes it possible to determine whether structural mechanical parameters (for example the Young's modulus, Poisson's ratio, the rate of propagation of the elastic waves) are within a range which further guarantees the continued use of the structural element 1.

The attitude sensors 21 to 23 with accelerometer can also advantageously be used to perform vibratory measurements.

For a 30 m rectilinear structural element 1 made of concrete, it is for example possible to envisage distributing at least 2 attitude sensors and preferably 7 attitude sensors over the length of this structural element, in order to benefit from a good accuracy of computation of its deformation.

Each attitude sensor 21 to 23 will advantageously comprise a triaxial accelerometer. Each attitude sensor can also comprise a temperature sensor and/or a multiaxial magnetometer.

FIGS. 2 to 5 illustrate more specifically an example of structure of an attitude sensor 20. The attitude sensor 20 comprises a printed circuit board 230. The printed circuit board 230 supports an accelerometer 231 and a computation circuit 232, illustrated schematically. The printed circuit 230 forms an electrical interconnection between the accelerometer 231 and the computation circuit 232. The computation circuit 232 computes, in a manner known per se, the attitude of the sensor 20 as a function of the measurements performed by the accelerometer 231.

The attitude sensor 20 comprises a shell 220 protecting the printed circuit 230, the accelerometer 231 and the computation circuit 232. The shell 220 has an elongate form in a longitudinal direction, corresponding to the longitudinal direction of the structural element 1 or of a steel bar to which the sensor 20 has to be fixed. Electric cables 201 and 202 enter into the shell 220 at opposite longitudinal ends. The electric cables 201 and 202 comprise, for example, communication wires connected to the computation circuit 232, power supply wires for the computation circuit 232 and for the accelerometer 231, and communication and/or power supply wires intended for another attitude sensor. The shell 220 here comprises a material coating the printed circuit 230, the accelerometer 231 and the computation circuit 232. The coating material is for example polyurethane or epoxy, which protects from chemical or physical-chemical attacks, which favours the absorption of any impacts and stresses during the pouring of the concrete, and which exhibits an optimal adherence with the concrete of the structural element to favour an intimate mechanical coupling therewith. The quality of the mechanical coupling between an attitude sensor and the concrete makes it possible to improve the accuracy of the attitude measurement on the structural element. The shell 220 can for example be moulded around the printed circuit 230, the accelerometer 231 and the computation circuit 232. The shell 220 can for example be moulded to a thickness of at least 15 mm over these elements.

Advantageously, the shell 220 comprises protuberances guaranteeing the stability of the position and of the attitude of the sensor 20 during the shrinking of the concrete, and its mechanical coupling to the concrete. Such protuberances also make it possible to avoid forming voids in the concrete when it shrinks. In the example illustrated, protuberances 223 and 224 are formed in the shell 220. These protuberances 223 and 224 are staggered longitudinally. These protuberances 223 and 224 each have an annular form, at right angles to the longitudinal direction of the sensor 20. The protuberances 223 and 224 for example protrude radially over at least 15 mm, preferably at least 20 mm relative to the rest of the shell 220.

The sensor 20 comprises plates 211 and 212, positioned at right angles to its longitudinal direction. The plates 211 and 212 are intended to ensure the fixing of the sensor 20 on a steel bar of the reinforcing structure, on the one hand to maintain its longitudinal position relative to the steel bar and maintain its attitude relative to this steel bar, even during concrete pouring steps. The plates 211 and 212 are advantageously made of metal, in order to exhibit a sufficient rigidity of the fixing of the sensor 20 with a steel bar. The plates 211 and 212 are advantageously relatively far apart, in order to improve the positioning of the sensor 20 relative to a steel bar. The distance between the plates 211 and 212 is for example at least equal to 250 mm. The accelerometer 231 is advantageously positioned between the plates 211 and 212. To allow the plates 211 and 212 to be fixed onto a steel bar, the plates 211 and 212 advantageously comprise respective through orifices 213 and 214. The orifices 213 and 214 are aligned longitudinally.

The shell 220 is here over moulded over the entries of the cables 201 and 202 and makes it possible to ensure a mechanical transfer of the forces exerted by the cables 201 and 202. The shell 220 is here over moulded over a part of the plates 211 and 212, in order to ensure a mechanical link between the printed circuit 230 and these plates 211 and 212.

The processing circuit 3 is configured to retrieve the attitude measurements from the different attitude sensors 21 to 23. The processing circuit 3 is configured to compute the overall deformation or the curvature of the structural element 1, as a function of the different attitude measurements retrieved.

Upon the deformation of the structural element 1 by deflection, the attitude of the different sensors 21 to 23 is modified, by virtue of their mechanical coupling with the concrete of the structural element. The processing circuit 3 is programmed to evaluate the attitude at any point of the structural element, from the measurements supplied by the sensors 21 to 23. Such an evaluation is for example performed by means of interpolation methods, such as cubic spline interpolation. Examples of interpolation and reconstruction methods are for example described in Chapter 1 of the doctoral thesis by N. Sprynski, "Reconstruction de courbes et surfaces à partir de données tangentielles" [Reconstruction of curves and surfaces from tangential data", Université Joseph Fourier, Grenoble, France, 2007.

Similarly, upon the deformation of the structural element 1 by torsion, the attitude of the different sensors 21 to 23 is modified, by virtue of their mechanical coupling with the concrete of the structural element.

An example for computing the deformation of the structural element 1 from the attitude/inclination measurements of the different attitude sensors can be as follows. It is assumed that the attitude sensors 21 to 23 are tri-axial sensors, performing a measurement m(t,s) expressed in g, with t the measurement instant and s the curvilinear abscissa of a sensor along the structural element 1. With $\varphi(t,s)$ the inclination and $\eta(t,s)$ its roll introduced above:

$$m(t, s) = \begin{bmatrix} \cos(\varphi(t, s)) \\ -\sin(\varphi(t, s)) * \sin(\eta(t, s)) \\ -\sin(\varphi(t, s)) * \cos(\eta(t, s)) \end{bmatrix}$$

The attitude sensors with triaxial accelerometers in the structural element 1, supply a spatial sampling of the inclination/attitude over all the length provided for these sensors, as a function of the curvilinear abscissa along this structural element 1. By using a model of interpolation or of approximation from discrete attitudes supplied by the attitude sensors 21 to 23, it is possible to extrapolate a continuous function representative of the inclination/attitude as a function of the curvilinear abscissa s along the structural element 1. The vertical deformation of the structural element 1 at any point is defined by using this function in the following relationship:

$$Def(t, s) = \begin{bmatrix} X(t, s) \\ Y(t, s) \end{bmatrix} = Def(t, s0) + \int_{u=s0}^{s} \begin{bmatrix} \cos(\varphi(t, u)) \\ \sin(\varphi(t, u)) \end{bmatrix} du$$

In the reference frame (O, $\vec{X}$, $\vec{Y}$) where $\vec{Y}$ is collinear with gravity and $\vec{X}$ is collinear with the neutral fibre.

Starting from the assumption that the curvilinear abscissa point s0 remains fixed in time (embedding of the structural element 1 at the abscissa s0 for example), then Def(t,s0)=0. The overall deformation is then fully determined via the continuous inclination function.

The accuracy of the computation of the overall deformation of the structural element 1 depends in particular on the following parameters of the attitude sensor:

its technology, influencing the following parameters: its resolution (the smallest acceleration which can be detected) of the attitude sensor, its measurement noise standard deviation (linked to the resolution in certain technologies), its temperature stability (drift in mg/° K) and its stability in time (drift in mg/year). The concept of stability in time integrates the drifts of sensitivity and of calibration of the sensor but also the drifts of the angles between each measurement axis for a triaxial accelerometer when it is composed of 3 right-angled monoaxial accelerometers;

the density and the spatial distribution of the attitude sensors along the structural element 1. The reconstruction is all the more accurate when the number of measurement nodes is high and their distribution is appropriate. For a structural element 1 of geometrical structure that is substantially homogenous over its length, a distribution of the attitude sensors that is uniform in the longitudinal direction is optimal. For such a structure, with the attitude sensors tested, a quantity of 1 attitude sensor per 10 meters of length proves sufficient, and 1 sensor every meter is optimal;

the uncertainties on the mounting of the attitude sensors. A triaxial accelerometer makes it possible to estimate the inclination that its own reference frame forms with the direction of orientation of the structural element 1. The overall inclination computed is all the more accurate when the axis of the reference frame which defines the inclination of each accelerometer of an attitude sensor is tangential to the overall deformation to be computed. Through calibration of the system of attitude sensors, the angle defining the deviation between the axis of the accelerometer and the tangent to the overall deformation to be computed is determined. The calibration is performed relative to a reference, here an item of information on the theoretical inclination/attitude at each measurement point of an attitude sensor, of a model or an appraisal. After the concrete has been poured and hardened, a structural element according to the invention is typically positioned with its longitudinal direction parallel to the horizontal, placed bearing on a flat surface. A calibration of each attitude sensor is then performed relative to this controlled theoretical inclination;

the uncertainties on the curvilinear abscissae of the attitude sensors. The uncertainty on the abscissa of an attitude sensor influences the reconstruction performance. The curvilinear abscissae are determined before the concrete is poured, for example by measurement or by fixing at abscissae that are well defined by abutments;

the interpolation/approximation model of the continuous inclination/attitude function. For a structural element 1 whose neutral fibre is substantially rectilinear, the inclination function is smooth and can be approximated via a polynomial of low degree, for example of degree 3. Other interpolation models are known per se to those skilled in the art for defining an inclination function from spot measurements.

In the example, an application to a rectilinear structural element 1 has been illustrated. The invention does of course apply to concrete structural elements that are not rectilinear or included in a structure of complex geometry.

The invention applies also to several instrumented products in one and the same construction work, making it possible to extrapolate a surface/volume deformation by interpolation of linear deformations discretized in space.

Figure 6:
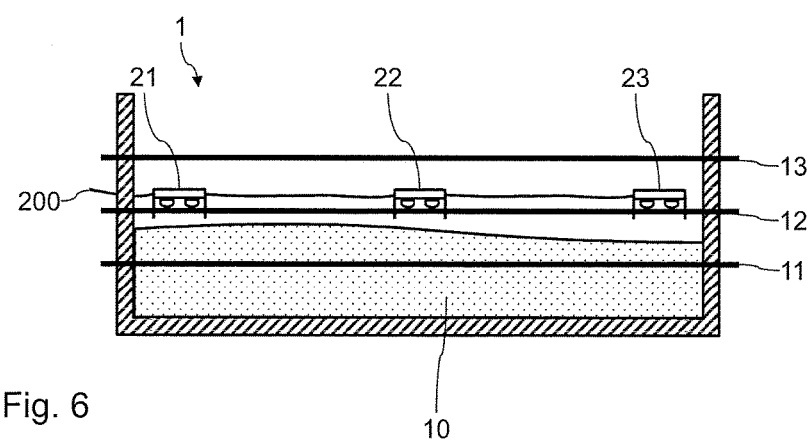
FIG. 6 is a side view in cross section of a step of an example of a method for manufacturing a structural element according to the invention.

FIG. 6 illustrates a schematic side view in cross section of a structural element 1 during a step of an example of a manufacturing method. In this example, a mould 3 has been supplied, intended to define the form of the structural element 1. A steel reinforcing structure for example comprising steel bars 11, 12 and 13 is supported by the mould 3. The steel bars 11 to 13 extend here in a longitudinal direction of the structural element 1 to be formed. The steel bars 11 to 13 can be linked to one another in a manner known per se by other transverse steel bars so as to form a lattice. Attitude sensors 21 to 23 have been first fixed or positioned from the steel bar 12. The attitude sensors 21 to 23 are at a distance from one another in the longitudinal direction of the structural element 1 to be formed. The attitude sensors 21 to 23 are distributed in this longitudinal direction. The attitude sensors 21 to 23 are here fixed onto a steel bar 12 positioned at the level of the neutral fibre of the structural element 1 to be formed. The longitudinal positioning of the different attitude sensors 21 to 23 can be either measured after their fixing onto the steel bar 12, or these attitude sensors 21 to 23 can be fixed at locations previously referenced along the steel bar 12.

The attitude sensors 21 to 23 are here connected by an electric cable or bundle 200, extending beyond the mould 3. The cable 200 will thus be both connected to the attitude sensors 21 to 23 and accessible from the outside, after the pouring of the concrete matrix. The cable 200 is intended to allow a communication between the attitude sensors 21 to 23 and the external processing circuit 3 and/or an electrical power supply for the attitude sensors 21 to 23. The cable 200 can typically run along the steel bar 12.

The steel bars 11 to 13 can be first subjected to a tensile stress, maintained until the concrete has hardened, so as to form a structural element 1 made of pre-stressed concrete. The application of a tensile stress on the steel bar 12 can be performed prior to the fixing of the attitude sensors 21 to 23 onto this steel bar. In FIG. 6, a concrete matrix 10 is being poured into the mould 3, so as to embed the steel bars 11 to 13. The concrete matrix 10 can for example be poured by gravity. In order to facilitate the evacuation of the air contained in the concrete matrix 10 in order to densify it, the mould 3 can be set to vibrate. At the end of the pouring of the concrete matrix 10, the mould 3 can be positioned in an oven in order to speed up the hardening of the concrete matrix 10. A wearing step with a duration that can reach 24 hours at a heating temperature ranging up to 60° can for example be implemented.

The process of manufacturing of the structural element 1 can then be continued by removal from the mould 3.

Before or after the removal from the mould 3, a step of calibration of the structural element 1 is implemented. By recording attitudes measured by the sensors 21 to 23, it is possible to calibrate the structural element 1 to take account of the impact of the manufacturing method on the attitude (in inclination and in roll) of the sensors 21 to 23, for example because of the pouring of the concrete matrix 10 or the vibration of the mould 3. The attitudes of the sensors 21 to 23 are thus measured for a nominal configuration of the structural element. The deformation of the structural element 1 relative to this nominal position will thus be able to be computed accurately.

Figure 7:
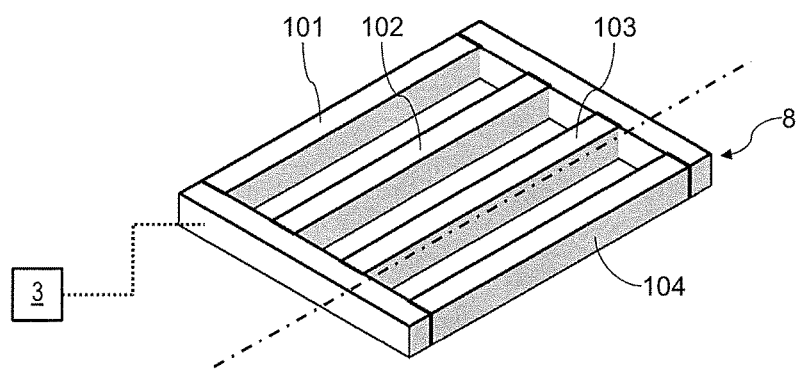
FIG. 7 is a perspective view of an example of a complete structure comprising several structural elements according to the invention.

FIG. 7 is a perspective view of an example of structure 8, comprising several structural elements 101 to 104 as detailed previously. The structural elements 101 to 104 are here rectilinear and extend in one and the same direction. The processing circuit 3 is here configured to compute an overall deformation of the structure 8, from the computation of the deformation of each of the structural elements 101 to 104.

The invention claimed is:
1. A concrete structural element, comprising:
a concrete matrix;
a steel reinforcing structure embedded in said matrix;

at least first and second attitude sensors apart from one another in a direction, embedded in said matrix and fixed to said reinforcing structure; and a processing circuit configured to recover attitude measurements supplied by each attitude sensor and configured to compute a deformation of said structural element relative to said direction as a function of the attitude measurements recovered.

2. A concrete structural element according to claim 1, in which said steel reinforcing structure comprises a steel bar on which the first and second attitude sensors are positioned.

3. A concrete structural element according to claim 2, in which said steel reinforcing structure comprises several steel bars forming a metal reinforcement or lattice.

4. A concrete structural element according to claim 3, in which said steel bars have a diameter of between 5 and 50 mm.

5. A concrete structural element according to claim 1, in which said first and second sensors are positioned at a distance from the neutral fibre of the structural element concerned at most equal to 40% of the neutral fibre/surface distance for a deflection about an axis at right angles to said direction.

6. A concrete structural element according to claim 1, in which each of said first and second attitude sensors comprises:
- an accelerometer configured to measure an acceleration component in said direction;
- a computation circuit configured to compute the attitude of the sensor as a function of the measurement from the accelerometer.

7. A concrete structural element according to claim 6, in which said computation circuit is configured to perform a vibratory measurement as a function of the measurement from the accelerometer.

8. A concrete structural element according to claim 6, in which each of said first and second attitude sensors comprises a support to which its respective accelerometer is fixed, the support comprising two plates at right angles to said direction, said accelerometer being positioned between these two plates.

9. A concrete structural element according to claim 8, in which said plates each comprise a respective orifice passed through by said reinforcing structure.

10. A concrete structural element according to claim 8, in which said plates are welded to said reinforcing structure.

11. A concrete structural element according to claim 8, in which said support comprises a shell over moulded over said accelerometer and over said computation circuit.

12. A concrete structural element according to claim 11, in which said shell is made of polyurethane over moulded to a thickness of at least 15 mm over said accelerometer and over said computation circuit.

13. A concrete structural element according to claim 11, in which said shell has at least one protuberance protruding radially by at least 15 mm.

14. A concrete structural element according to claim 13, in which said protuberance has an annular form at right angles to said direction.

15. A structure comprising:
- several concrete structural elements according to claim 1;
- a processing circuit configured to compute an overall deformation from the deformation calculated for each of said structural elements.

16. A concrete structural element according to claim 1, in which said steel reinforcing structure comprises several steel bars forming a metal reinforcement or lattice and the said first and second sensors are fixed on one of the steel bars which corresponds to a position at a level of the neutral fibre of the concrete structural element.

* * * * *